United States Patent
Swanson et al.

(10) Patent No.: US 8,459,280 B2
(45) Date of Patent: Jun. 11, 2013

(54) SUPPORT STRUCTURE REMOVAL SYSTEM

(75) Inventors: William J. Swanson, St. Paul, MN (US); Dominic F. Mannella, Minnetonka, MN (US); Ronald G. Schloesser, New Brighton, MN (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

(21) Appl. No.: 13/241,454

(22) Filed: Sep. 23, 2011

(65) Prior Publication Data

US 2013/0075957 A1 Mar. 28, 2013

(51) Int. Cl.
*B08B 3/00* (2006.01)

(52) U.S. Cl.
USPC .................. 134/184; 134/117; 425/3

(58) Field of Classification Search
None
See application file for complete search history.

(56) References Cited

U.S. PATENT DOCUMENTS

| | | | |
|---|---|---|---|
| 3,421,528 A | 1/1969 | Gomez et al. |
| 3,974,843 A | 8/1976 | Aubert |
| 4,397,986 A | 8/1983 | Hornbaker |
| 4,551,369 A | 11/1985 | Belz |
| 4,671,982 A | 6/1987 | Belz |
| 4,870,148 A | 9/1989 | Belz et al. |
| 4,886,856 A | 12/1989 | Chen et al. |
| 5,121,329 A | 6/1992 | Crump |
| 5,303,141 A | 4/1994 | Batchelder et al. |
| 5,317,043 A | 5/1994 | Gass |
| 5,322,078 A | 6/1994 | Tuttle |
| 5,322,878 A | 6/1994 | Deibig et al. |
| 5,336,755 A | 8/1994 | Pape |
| 5,340,433 A | 8/1994 | Crump |
| 5,346,955 A | 9/1994 | Sasse et al. |
| 5,378,751 A | 1/1995 | Deibig et al. |
| 5,402,351 A | 3/1995 | Batchelder et al. |
| 5,474,719 A | 12/1995 | Fan et al. |
| 5,503,785 A | 4/1996 | Crump et al. |
| 5,653,925 A | 8/1997 | Batchelder |
| 5,695,707 A | 12/1997 | Almquist et al. |
| 5,764,521 A | 6/1998 | Batchelder et al. |
| 5,863,885 A | 1/1999 | Ruggieri et al. |
| 5,866,058 A | 2/1999 | Batchelder et al. |
| 5,939,008 A | 8/1999 | Comb et al. |
| 5,950,644 A | 9/1999 | Brewer |
| 6,022,207 A | 2/2000 | Dahlin et al. |
| 6,067,480 A | 5/2000 | Stuffle et al. |
| 6,070,107 A | 5/2000 | Lombardi et al. |
| 6,129,872 A | 10/2000 | Jang |

(Continued)

FOREIGN PATENT DOCUMENTS

| DE | 102009047237 A1 | 8/2011 |
|---|---|---|
| WO | WO-2010/088618 A1 | 8/2010 |
| WO | WO-2011/084995 A1 | 7/2011 |

OTHER PUBLICATIONS

U.S. Appl. No. 13/081,956, filed Apr. 7, 2011.

*Primary Examiner* — Eric Golightly
(74) *Attorney, Agent, or Firm* — Brian R. Morrison; Westman, Champlin & Kelly, P.A.

(57) ABSTRACT

A support structure removal system comprising a vessel and a second component. The vessel comprises a vessel body, a porous floor configured to retain a three-dimensional part, and an impeller rotatably mounted below the porous floor. The second component comprises a surface configured to operably receive the vessel, and a rotation-inducing assembly located below the surface, where the rotation-inducing assembly is configured to rotate the impeller with magnetic fields when the vessel is received on the surface of the second component to agitate and direct flows of an aqueous fluid through the porous floor.

8 Claims, 13 Drawing Sheets

U.S. PATENT DOCUMENTS

| | | |
|---|---|---|
| 6,165,406 A | 12/2000 | Jang et al. |
| 6,175,422 B1 | 1/2001 | Penn et al. |
| 6,228,923 B1 | 5/2001 | Lombardi et al. |
| 6,398,495 B1 | 6/2002 | Kazianus |
| 6,572,807 B1 | 6/2003 | Fong |
| 6,645,412 B2 | 11/2003 | Priedeman, Jr. |
| 6,722,872 B1 | 4/2004 | Swanson et al. |
| 6,790,403 B1 | 9/2004 | Priedeman, Jr. et al. |
| 6,814,907 B1 | 11/2004 | Comb |
| 6,907,307 B2 | 6/2005 | Chen et al. |
| 6,923,634 B2 | 8/2005 | Swanson et al. |
| 7,077,638 B2 | 7/2006 | Leyden et al. |
| 7,236,166 B2 | 6/2007 | Zinniel et al. |
| 7,255,821 B2 | 8/2007 | Priedeman, Jr. et al. |
| 7,648,609 B2 | 1/2010 | Leder et al. |
| 7,754,807 B2 | 7/2010 | Priedeman, Jr. et al. |
| 2003/0090752 A1 | 5/2003 | Rosenberger et al. |
| 2004/0222561 A1 | 11/2004 | Hopkins |
| 2005/0004282 A1 | 1/2005 | Priedeman, Jr. et al. |
| 2005/0103360 A1 | 5/2005 | Tafoya |
| 2005/0129941 A1 | 6/2005 | Comb et al. |
| 2005/0133155 A1 | 6/2005 | Leder et al. |
| 2005/0173838 A1 | 8/2005 | Priedeman, Jr. et al. |
| 2007/0003656 A1 | 1/2007 | LaBossiere et al. |
| 2007/0228590 A1 | 10/2007 | LaBossiere et al. |
| 2008/0213419 A1 | 9/2008 | Skubic et al. |
| 2009/0035405 A1 | 2/2009 | Leavitt |
| 2009/0173443 A1 | 7/2009 | Kozlak et al. |
| 2009/0283119 A1 | 11/2009 | Moussa et al. |
| 2010/0096072 A1 | 4/2010 | Hopkins et al. |
| 2011/0186081 A1 | 8/2011 | Dunn et al. |

SUPPORT STRUCTURE REMOVAL SYSTEM

BACKGROUND

The present disclosure relates to additive manufacturing technologies for printing or otherwise building three-dimensional (3D) parts and support structures. In particular, the present disclosure relates to systems for removing support structures from 3D parts printed or built with additive manufacturing systems, such as extrusion-based additive manufacturing systems.

An extrusion-based additive manufacturing system is used to print a 3D part from a digital representation of the 3D part in a layer-by-layer manner by extruding a flowable part material. The part material is extruded through an extrusion tip carried by an extrusion head, and is deposited as a sequence of roads on a substrate in an x-y plane. The extruded part material fuses to previously deposited part material, and solidifies upon a drop in temperature. The position of the extrusion head relative to the substrate is then incremented along a z-axis (perpendicular to the x-y plane), and the process is then repeated to form a 3D part resembling the digital representation.

Movement of the extrusion head with respect to the substrate is performed under computer control, in accordance with build data that represents the 3D part. The build data is obtained by initially slicing the digital representation of the 3D model into multiple horizontally sliced layers. Then, for each sliced layer, the host computer generates tool paths for depositing roads of the part material to form the 3D part.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the build process. The support material adheres to the part material during fabrication, and is removable from the completed 3D part when the build process is complete.

Support structures for use in printing or building 3D parts in additive manufacturing systems are typically classified in two categories: Break-away support materials and soluble or melt-away support materials. Break-away support materials may be manually broken away from the resulting 3D parts by hand or using tools. In comparison, soluble support materials may be dissolved in aqueous solutions. Typically, optimal dissolution of a soluble support material requires heat and agitation, which is provided in various commercially-available support removal tanks or vessels designed to dissolve supports from additive-manufactured parts.

SUMMARY

An aspect of the present disclosure is directed to a support structure removal system. The support structure removal system includes a vessel and a second component (e.g., a reservoir tank and base unit). The vessel includes a vessel body having a top opening and being configured to retain an aqueous fluid, a porous floor supported by the vessel body being configured to retain a 3D part inserted through the top opening, and an a impeller rotatably mounted below the porous floor. The second component includes a surface configured to operably receive the vessel, and a rotation-inducing assembly located below the surface, the rotation-inducing assembly being configured to rotate the impeller with magnetic fields when the vessel is received on the surface of the second component to agitate and direct flows of the aqueous fluid through the porous floor.

Another aspect of the present disclosure is directed to a support structure removal system for removing support structures from 3D parts built with additive manufacturing systems. The support structure removal system includes a reservoir tank having tank walls and a tank floor that define an interior volume configured to retain an aqueous fluid, a plurality of vessels configured to be inserted into the interior volume of the reservoir tank to at least partially fill the vessels with the aqueous fluid, where the plurality of vessels each comprise an impeller. The support structure removal system also includes a plurality of magnet assemblies located below the tank floor, where each of the plurality of magnet assemblies is configured to generate a rotating magnetic field that induces the impellers to rotate when the vessels are inserted into the interior volume to agitate the aqueous fluid within the vessels.

Another aspect of the present disclosure is directed to a method for removing support structures from 3D parts built with additive manufacturing systems. The method includes placing a 3D part and a support structure in a vessel having vessel walls and a porous floor, and inserting the vessel into a reservoir tank, where the reservoir tank includes an aqueous fluid that at least partially fills the inserted vessel to immerse the 3D part and the support structure in the aqueous solution within the vessel. The method also includes generating a rotating magnetic field within the reservoir tank, rotating an impeller located below the porous floor with the generated rotating magnetic field to agitate the aqueous solution within the vessel, and dissolving at least a portion of the support structure with the agitated aqueous solution within the vessel.

DETAILED DESCRIPTION

The present disclosure is directed to a support structure removal system for removing soluble support structures from 3D parts printed with additive manufacturing systems, such as extrusion-based additive manufacturing systems developed by Stratasys, Inc., Eden Prairie, Minn. under the trademark "FDM". As discussed below, the removal system is configured to receive multiple 3D parts with corresponding soluble support structures, and to efficiently remove (e.g., dissolve) the soluble support structures from the respective 3D parts on an individual basis by agitating portions of a common aqueous fluid in a localized manner. As such, the removal system is particularly suitable for use with 3D printing farms of additive manufacturing systems capable of printing 3D parts in large-production volumes.

Figure 1:
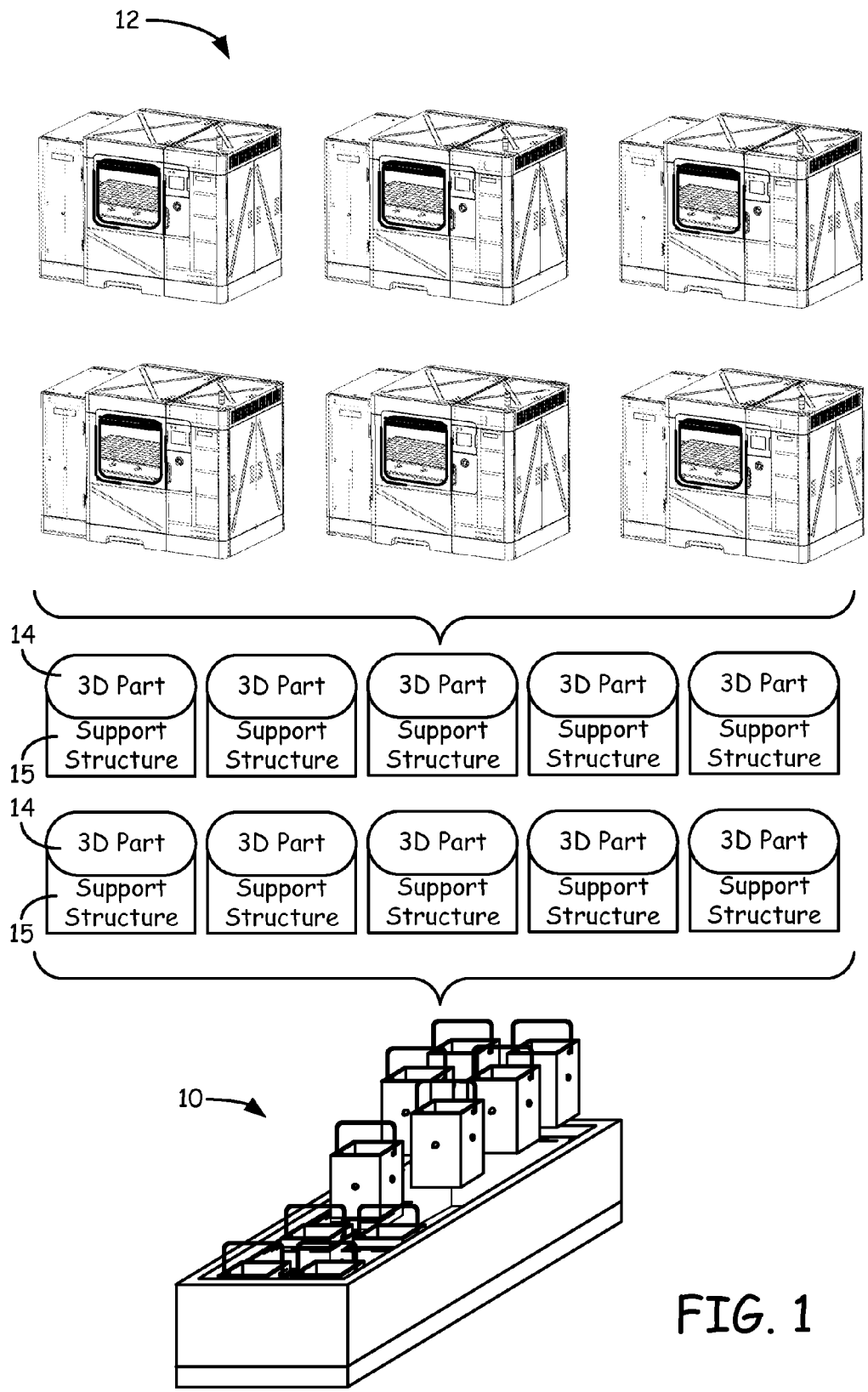
FIG. 1 is a schematic illustration of a support structure removal system of the present disclosure in use with a 3D printing farm of additive manufacturing systems.

As shown in FIG. 1, support structure removal system 10 is utilized with a 3D printing farm of multiple additive manufacturing systems, referred to as farm 12. In the shown example, farm 12 includes multiple extrusion-based additive manufacturing systems commercially available from Stratasys, Inc., Eden Prairie, Minn. under the trade designation FORTUS 900mc 3D Production Systems. However, removal system 10 may be used in conjunction with a variety of different additive manufacturing systems that print or otherwise build 3D parts from part materials, along with printing or otherwise building soluble support structures from soluble support materials. Examples of suitable soluble support materials and support structures for use with removal system 10 include those disclosed in Priedeman et al., U.S. Pat. No. 7,754,807; Hopkins et al., U.S. Patent Application Publication No. 2010/0096072; and Rodgers, U.S. patent application Ser. No. 13/081,956; and those commercially available under the trade designations "SR-10", "SR-20", and "SR-30" Soluble Supports from Stratasys, Inc., Eden Prairie, Minn.

During operation, the additive manufacturing systems of farm 12 individually produce 3D parts 14 and corresponding support structures 15, where each support structure 15 may be built underneath overhanging portions or in cavities of the respective 3D part 14 under construction. The portion of 3D parts 14 and support structures 15 that contain soluble support structures (e.g., as opposed to break-away support structures) may be removed from the additive manufacturing systems and placed in removal system 10 to remove (e.g., dissolve) the soluble support structures 15 from the 3D parts 14. As such, a single removal system 10 may be used in conjunction with multiple additive manufacturing systems.

In a 3D printing farm, such as farm 12, it is desirable to maximize part production by scheduling the printing runs in an efficient manner that minimizes down times of the additive manufacturing systems. However, in addition to scheduling the availabilities of the additive manufacturing systems, operators of 3D printing farms also need to consider process times and labor required to remove the support structures from the 3D parts. For example, in situations in which the 3D printing farm includes a number of support removal tanks or vessels, each of these support removal vessels may require separate filling, operation, and draining, which can increase time, labor and cost of production.

Alternatively, multiple 3D parts may be placed in a single support removal tank or vessel, and the support removal process on the multiple 3D parts may be performed in a batch manner. However, the run times of the additive manufacturing systems in 3D printing farms may vary greatly depending on numerous factors, such as the types of additive manufacturing systems and techniques used, the dimensions of the 3D parts and support structures, the complexities of the 3D parts, the part and support materials used, scheduling and maintenance requirements, and the like. As such, the 3D parts may be printed and removed from their respective additive manufacturing systems at different times, which can vary by several hours or even days. Moreover, the length of time expected for the dissolution of supports from a given part varies depending on factors such as part size and geometry, support style, and support material composition. A batch support removal process can place a substantial bottleneck on the schedule of the 3D printing farm due to these inefficiencies.

A single support removal tank operated in a shared, continuous manner likewise presents disadvantages. Multiple 3D parts may be separately added to and removed from a single support removal tank or vessel in a continuous manner so as to accommodate run-time variations and dissolution-time variations. However, this presents challenges in tracking the identify and progress of the multiple 3D parts in a given tank or vessel, and may also present hazards to the operator in accessing and handling parts immersed in agitated aqueous solution.

To accommodate the run-time variations, dissolution-time variations and labor requirements, and to make efficient of use water resources and tank space, removal system 10 includes multiple separate vessels that are configured to immerse 3D parts 14/support structures 15 in a common aqueous fluid, yet on an individual basis. As discussed below, this continuous batch system reduces potential bottlenecks on the schedule of farm 12 by accommodating individual processing of 3D parts 14/support structures 15. Using removal system 10, the support structures 15 are removed from the 3D parts 14 independently of when other 3D parts 14 are ready for support structure removal, independently of dissolution times of other support structure 15, and with ease of labor. Furthermore, removal system 10 removes (e.g., dissolves) the support structures 15 from the respective 3D parts 14 by agitating a common aqueous fluid in a localized manner. Utilizing a common aqueous fluid in a single tank makes efficient use of water and tank resources. At the same time, the localized agitation may provide increased dissolution rates by agitating the aqueous fluid in a local region around each 3D part 14/support structure 15.

Figure 2:
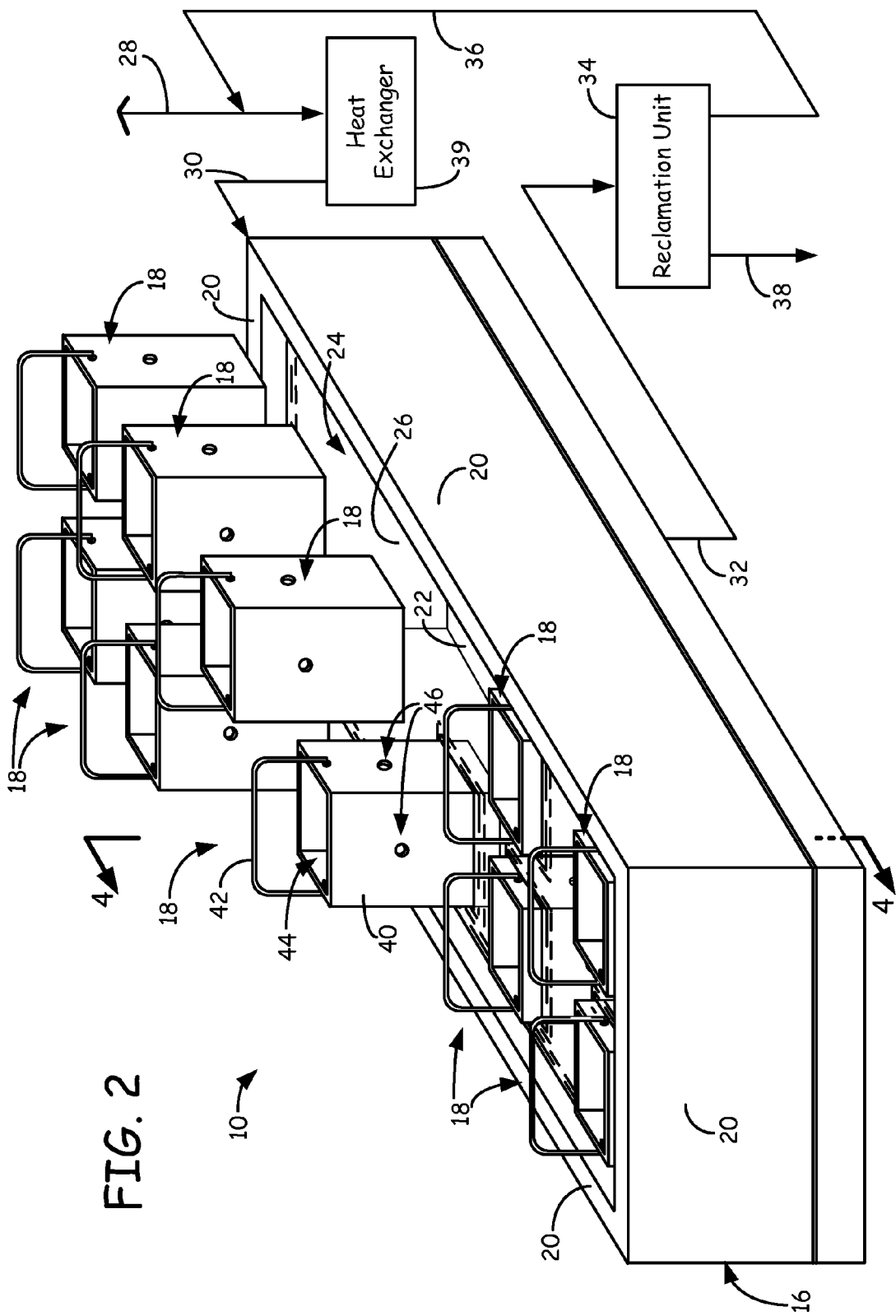
FIG. 2 is a perspective view of the support structure removal system of the present disclosure, which includes a reservoir tank and multiple removable vessels.

As shown in FIG. 2, removal system 10 includes trough or reservoir tank 16 and multiple removable vessels 18. In the shown example, reservoir tank 16 is configured to receive 10 vessels 18 in a 2×5 arrangement. In alternative embodiments, reservoir tank 16 may be configured to retain any suitable number of vessels 18, such as required by the types and numbers of additive manufacturing systems in farm 12. Examples of suitable numbers of vessels 18 for use in reservoir tank 16 include at least one, with particularly suitable numbers ranging from six to twenty. Additionally, as discussed below, removal system 10 may also include a separate rinsing tank (not shown in FIG. 2) to clean 3D parts 14 after the support removal process in reservoir tank 16.

Reservoir tank 16 includes tank walls 20 and tank floor 22, which define interior volume 24 for holding an aqueous fluid, referred to as aqueous fluid 26. Tank walls 20 and tank floor 22 are desirably fabricated in a sealed arrangement from one or more metallic and/or polymeric materials (e.g., stainless steel) to prevent aqueous fluid 26 from leaking. For example, tank walls 20 and tank floor 22 may be molded or otherwise formed from a single sheet of a metallic and/or polymeric material, without any openings therethrough, except for fluid lines. While illustrated with a rectangular cross section, reservoir tank 16 may alternatively have a variety of different geometric cross sections. Suitable volumes for interior volume 24 may also vary depending on particular needs. Examples of suitable volumes for interior volume 24 include at least about 25 gallons, and, in some embodiments, may range from about 100 gallons to about 300 gallons.

Aqueous fluid 26 may be introduced into reservoir tank 16 from supply line 28 and inlet line 30, and may exit reservoir tank 16 through outlet line 32. Supply line 28, inlet line 30, and outlet line 32 are fluid lines for transferring quantities of aqueous fluid 26 to and from reservoir tank 16. Inlet line 30 desirably dispenses aqueous liquid 26 at or adjacent to a top location of tank walls 20 to fill interior volume 24. Outlet line 32 is desirably located at or adjacent to tank floor 22, and provides an exit route for draining aqueous fluid 26 from interior volume 24.

In the shown embodiment, removal system 10 also includes reclamation unit 34, recirculation line 36, and drain line 38. Reclamation unit 34 is a separate treatment tank configured to reclaim at least a portion of the soluble support materials that are dissolved or otherwise suspended in aqueous fluid 26. For example, in some embodiments, reclaiming unit 34 may include a pH modifier and/or temperature adjustment to lower the pH of the aqueous solution, thereby precipitating the dissolved or otherwise suspended soluble support material out of the aqueous solution. Recirculation line 36 is configured to recycle aqueous fluid 26 back into inlet line 30 and/or directly into reservoir tank 16. Drain line 38 is a drain route for draining or otherwise discarding aqueous fluid 26 from reservoir tank 16 in an environmentally-friendly manner.

Removal system 10 also includes heat exchanger 39, which is one or more heat exchange elements configured to heat aqueous fluid 26 to one or more desired temperatures to assist in dissolving the soluble support structures. In the shown embodiment, heat exchanger 39 is positioned downstream from supply line 28 and upstream from inlet line 30. However, reservoir tank 16 may also or alternatively include one or more heat exchange elements (e.g., heating coils, not shown) to heat aqueous fluid 26 to the one or more desired temperatures. For example, removal system 10 may include one or more pad heaters secured to the outside of tank walls 20. The use of pad heater(s) on the outside of tank walls 20 is suitable for conductively heating aqueous solution 26 through the walls of reservoir tank 16, while also preventing direct contact between the pad heater(s) and aqueous solution 26. This prevents aqueous solution 26 from damaging the pad heater (s).

Removal system 10 may also include one or more temperature, pH sensors, and/or flow sensors (not shown in FIG. 1) to monitor the temperature, pH, and flow of aqueous fluid 26 in interior volume 24, inlet line 30, outlet line 32, reclamation unit 34, recirculation line 36, and/or drain line 38. This allows a computer-based controller (not shown) of removal system 10 to adjust the temperature, pH, and/or flow rates with one or more process control loops to maintain aqueous fluid 26 at substantially steady-state conditions.

For example, removal system 10 may circulate aqueous fluid 26 through interior volume 26, outlet line 32, reclamation unit 34, recirculation line 36, and inlet line 30 to maintain a steady-state flow of aqueous fluid 26 in a bleed-and-feed manner, where the temperature and pH of the circulating aqueous fluid 26 may be adjusted as needed. Alternatively, removal system 10 may retain a batch volume of aqueous fluid 26 in interior volume 26 in a drain-and-fill manner, and adjust the temperature and pH of aqueous fluid 26 as needed. After a given duration, the batch volume of aqueous fluid 26 may be drained from interior volume 24, and a fresh batch volume of aqueous fluid 26 may be introduced for subsequent use.

Aqueous fluid 26 is a liquid or solution for reservoir tank 16, and includes water and, optionally, one or more organic solvents, as a carrier medium. For example, in situations in which the soluble support structures are at least partially dissolvable in neutral water, aqueous fluid 26 may consist essentially of water. Alternatively, aqueous fluid 26 may include an aqueous solution, such as a solution of water (and, optionally, one or more organic solvents) and one or more support removal compositions. As used herein, the term "solution", includes full solutions in which a support removal composition is fully dissolved in a carrier medium (e.g., water), and partial solutions in which the support removal composition is at least partially dissolved, emulsified, and/or otherwise suspended in the carrier medium.

Examples of suitable support removal compositions for use with removal system 10 include a support removal solution commercially available under the trademark "WATER-WORKS" from available Stratasys, Inc., Eden Prairie, Minn.; and those disclosed in Dunn et al., U.S. Patent Application Publication No. 2011/0186081. The support removal composition(s) may be mixed with the carrier medium to provide aqueous fluid 26 before or after being introduced into interior volume 24. For example, in one embodiment, the support removal composition(s) and the carrier medium may initially be combined to produce aqueous fluid 26, and the resulting aqueous fluid 26 may then be introduced into interior volume 24 via inlet line 30. Alternatively, the carrier medium may be introduced into interior volume 24 via inlet line 30, and the support removal composition(s) may then be added to interior volume 24 and mixed with the carrier medium to produce aqueous fluid 26.

Each vessel 18 is configured to retain one or more 3D parts 14 and corresponding soluble support structures 15, and may be inserted into interior volume 24 at designated locations. As shown, each vessel 18 includes vessel body 40 and handle 42. Vessel body 40 is a rigid body wall portion manufactured from one or more metallic and/or polymeric materials (e.g., stainless steel). Vessel body 40 defines top opening 44 for inserting the 3D parts 14 and soluble support structures 15, where handle 42 is desirably connected to vessel body 40 in a manner that provides access to top opening 44 (e.g., handle 42 may pivot away from top opening 44). Vessel body 30 also defines lateral openings 46, which are one or more holes or other openings that allow a portion of aqueous fluid 26 to fill the interior region of vessel body 40 when vessel 18 is inserted into interior volume 24 of reservoir tank 16.

As discussed below, each vessel 18 also includes an impeller (not shown in FIG. 2) located below screen 52 (described below), which is configured to agitate the portion of aqueous fluid 26 that fills the interior region of vessel body 40, thereby agitating aqueous fluid 26 in a localized manner. The impellers are correspondingly operated by rotating magnetic fields that are generated from magnet assemblies (not shown in FIG. 2) located below tank floor 26. As such, during operation, an operator may insert a 3D part 14/support structure 15 into a vessel 18, and insert the vessel 18 into interior volume 24 of reservoir tank 16 (via handle 42). As the vessel 18 enters interior volume 24, a portion of aqueous fluid 26 fills the interior region of vessel body 40, desirably immersing the 3D part 14 and corresponding support structure 15 below the surface of aqueous fluid 26.

When fully inserted into reservoir tank 16, the magnet assembly of reservoir tank 16 may be activated to generate the rotating magnetic field, thereby rotating the impeller of vessel 18. The rotation of the impeller correspondingly agitates the aqueous fluid 26 in a localized manner within vessel body 40, which increases the rate that aqueous fluid 26 dissolves the soluble support material within vessel body 40. This correspondingly increases the rate of removing soluble support structure 15 from 3D part 14. The dissolved support material may be collected at reclamation unit 34, and aqueous solution 26 may be recycled through recirculation line 36 and inlet line 30, or may be discarded in an environmentally-friendly manner through drain line 38. The collected support material from reclamation unit 34 may also be recycled and re-compounded into support material for future build processes.

After the removal process is complete, the magnet assembly of reservoir tank 16 may be deactivated. The operator may then remove vessel 18 from reservoir tank 16 (via handle 42). Upon removal from interior volume 24, aqueous fluid 26 drains from lateral openings 46 and floor opening(s) of vessel body 30 (not shown in FIG. 2). The resulting 3D part 14 may then rest in vessel 18 until dried, or may be removed from vessel 18 and dried. After removing the 3D part 14, vessel 18 is then ready to receive another printed part 14 for a subsequent removal process.

As shown, reservoir tank 16 can accommodate multiple vessels 18 at the same time. As such, multiple soluble support structures 15 may be removed from their respective 3D parts 14 on an individual basis, where portions of aqueous fluid 26 may each be agitated in a localized manner with the vessel body 40 of each vessel 18. Thus, the support removal processes may be performed independently of each other, on an individual basis, with the use of a common aqueous fluid 26. For example, a first support structure 15 of a first 3D part 14 may undergo the support removal process in removal system 10 while a second support structure 15 of a second 3D part 14 is already undergoing a separate support removal process in removal system 10. In other words, the support removal processes may be performed at staggered and overlapping times.

Figure 3:
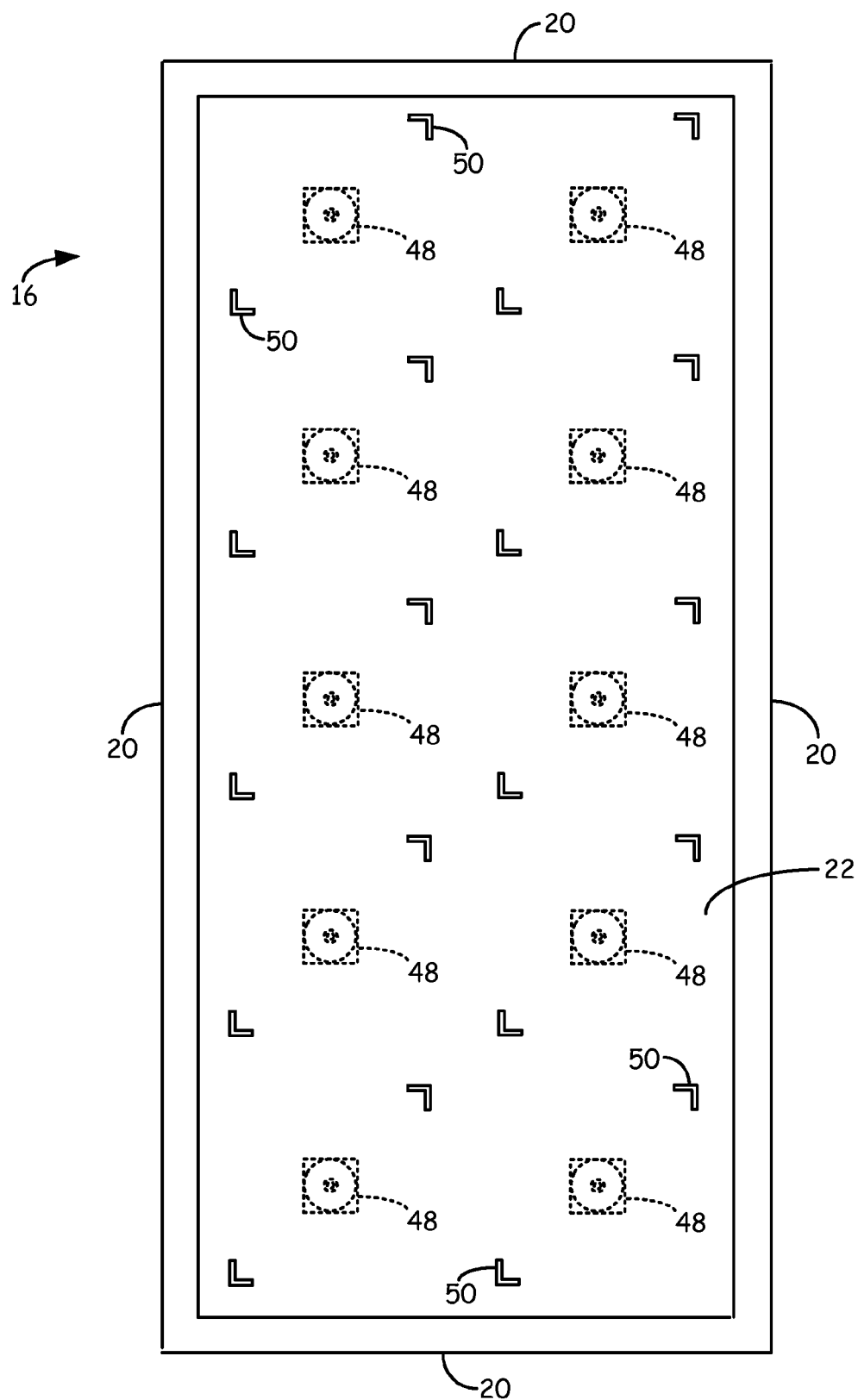
FIG. 3 is a top view of the reservoir tank of the support structure removal system.

As shown in FIG. 3, reservoir tank 16 includes multiple magnet assemblies 48 (illustrated with broken lines) located below tank floor 22. Each magnet assembly 48 is a rotation-inducing assembly configured to rotate an impeller of a vessel 18 via a rotating magnetic field to agitate aqueous fluid 26 in a localized manner. In one embodiment, the impellers of each vessel 18 may align with a corresponding magnet assembly 48 through magnetic coupling. As further shown, reservoir tank 16 may also optionally include alignment tabs 50 or other alignment structures, which are configured to align with vessel body 40 of each vessel 18. While illustrated with square cross sections in FIG. 2, vessel body 40 of vessel 18 may alternatively have a variety of different cross-sectional geometries (e.g., a circular or oval cross-sectional geometry). Alignment tabs 50 may correspondingly vary with the cross-sectional geometries of vessel bodies 40.

Figure 4A:
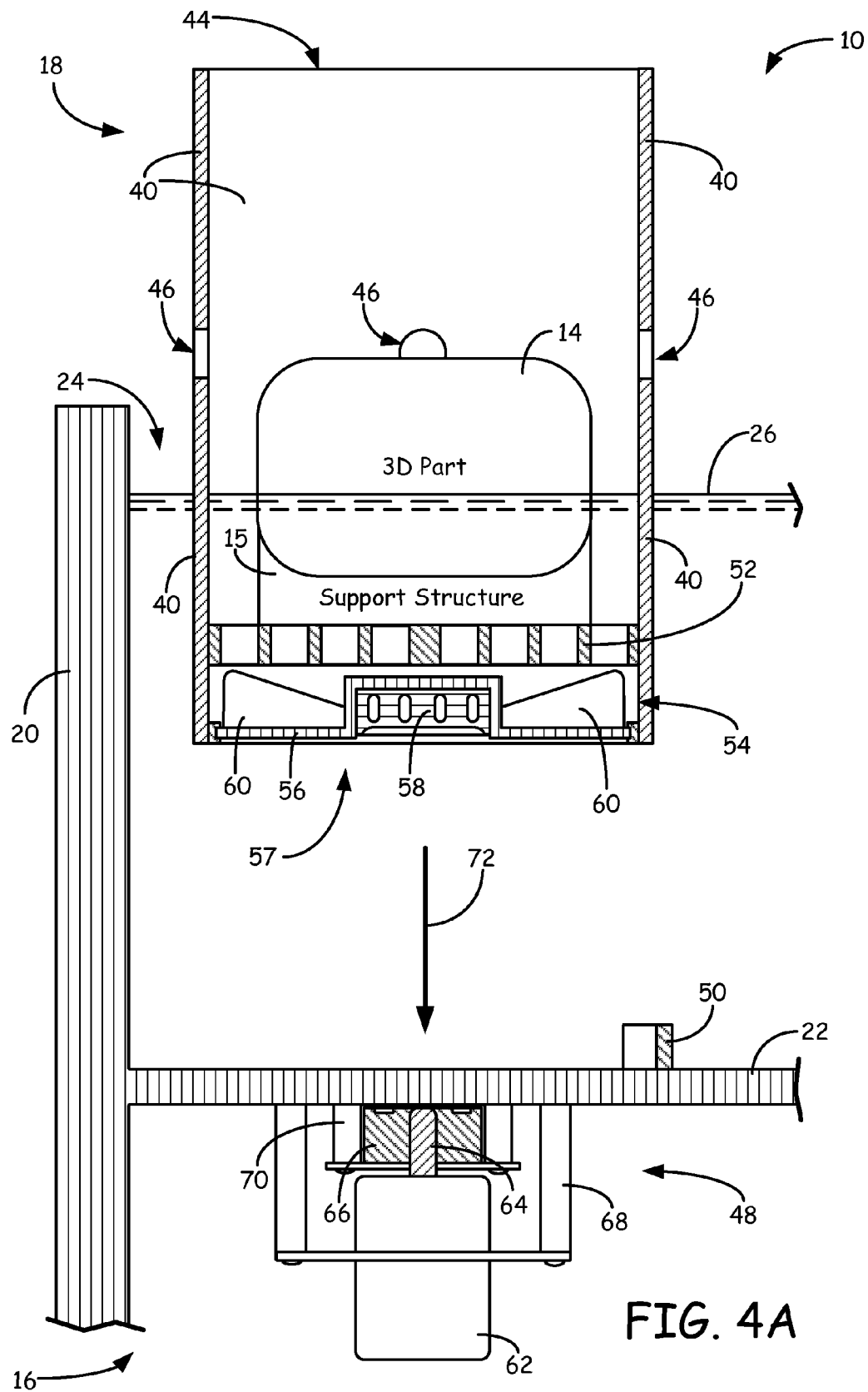
FIGS. 4A-4D are sectional views of Section 4-4 taken in FIG. 3, illustrating a process for inserting one of the multiple removable vessels into the reservoir tank, and for operating the support structure removal system.

FIGS. 4A-4D illustrate an example process for removing a soluble support structure 15 from a 3D part 14 with removal system 10. As shown in FIG. 4A, vessel 18 also includes floor screen 52 and impeller assembly 54. Floor screen 52 is a porous floor, such as a screen, grate, mesh, and the like, which is configured to allow aqueous fluid 26 to flow therethrough, while also retaining 3D part 14 and support structure 15. Floor screen 52 may be fabricated from one or more metallic and/or polymeric materials, and may be secured to vessel body 40, as shown. In this embodiment, vessel 18 does not include a solid bottom floor, thereby defining bottom opening 57 below impeller assembly 54.

Impeller assembly 54 includes frame component 56, magnetic hub 58, and impeller 60. Frame component 56 is desirably secured to vessel wall 40, and rotatably supports magnetic hub 58 and impeller 60 within vessel wall 40. Magnetic hub 58 includes one or more magnets that rotate via the rotating magnetic field generated by magnet assembly 48. Impeller 60 is secured to magnetic hub 58, thereby allowing the rotation of magnetic hub 58 to correspondingly rotate impeller 60.

Magnet assembly 48, located below tank floor 22, includes motor 62, drive shaft 64, and magnet ring 66. Motor 62 is an electric motor secured to the bottom side of tank floor 22 with retention bracket 68. Drive shaft 64 is coupled to motor 62, allowing motor 62 to rotate drive shaft 64. Magnet ring 66 is a ring array of multiple magnets with alternating polarities, which is coupled to the opposing end of drive shaft 64, allowing the rotation of drive shaft 64 to rotate magnet ring 66 to generate the rotating magnetic field for impeller assembly 54. Magnet ring 66 may be rotatably retained against the bottom side of tank floor 22 with retention bracket 70.

During use, an operator may insert 3D part 14/support structure 15 into vessel 18, and insert vessel 18 into interior volume 24 of reservoir tank 16 (depicted by arrow 72). As shown in FIG. 4A, as vessel 18 enters interior volume 24, a portion of aqueous fluid 26 fills the interior region of vessel body 40 through bottom opening 57 and floor screen 52, and lateral openings 46.

Figure 4B:
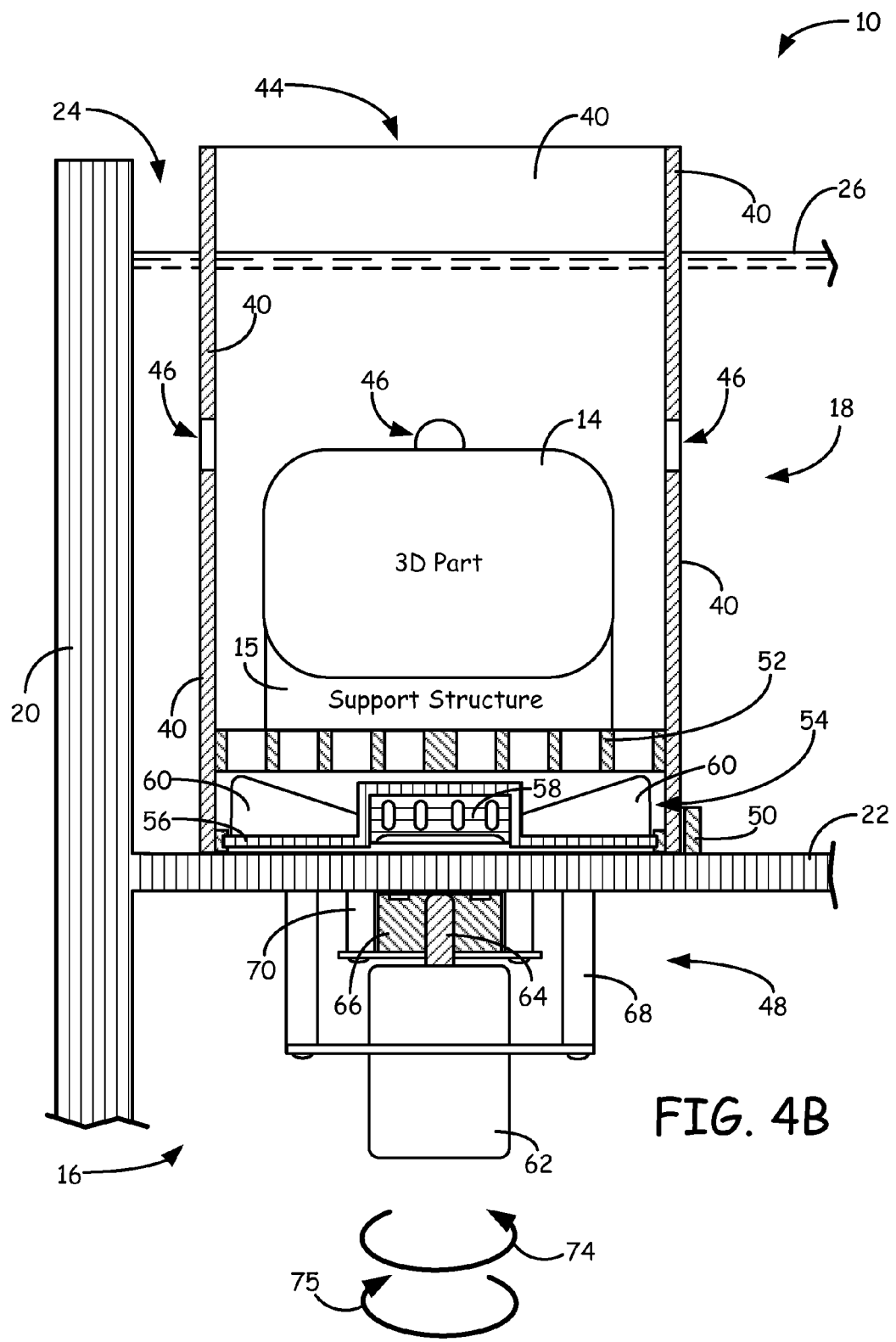

As shown in FIG. 4B, when fully inserted into reservoir tank 16, 3D part 14/support structure 15 is desirably immersed below the surface of aqueous fluid 26. Motor 62 may then be activated to rotate drive shaft 64 and magnet ring 66, such as in the rotational direction of arrow 74. This generates a rotating magnetic field that rotates the magnet(s) of magnetic hub 58 in a first rotational direction, such as in the rotational direction of arrow 74. The rotation of magnetic hub 58 correspondingly rotates impeller 60 in the rotational direction of arrow 74, thereby agitating the portion of aqueous fluid 26 within vessel 18. The agitated portion of aqueous fluid 26 is drawn and jetted through floor screen 52, and flows throughout the interior region of vessel body 40.

The agitation of aqueous fluid 26 in this localized manner increases the flow rate and turbulence of aqueous fluid 26 within vessel 18. This correspondingly increases the dissolution rate of the soluble support material of support structure 15, which increases the rate of removing support structure 15 from 3D part 14. Additionally, motor 62 may periodically reverse the rotation of magnet ring 66 to a second rotational direction that is counter to the first rotational direction of arrow 74, such as in the rotational direction of arrow 75. This accordingly reverses the rotation of impeller 60 to the rotational direction of arrow 75.

An important factor in rapidly removing support structure 15 is to increase the flow of aqueous fluid 26 adjacent to all available surfaces of support structure 15. Depending on the geometry of 3D part 14, the combination of 3D part 14 and support structure 15 may become lodged against floor screen 52 and/or the walls of vessel body 40 of vessel 18. In these fixed positions, circulation of aqueous fluid 26 may be reduced is some regions of 3D part 14 and support structure 15. Reversing the rotation of impeller 60 periodically is found to loosen 3D part 14 from floor screen 52 and/or the walls of vessel body 40, as well as providing impingement flow of aqueous fluid 26 to additional regions of 3D part 14 and support structure 15. Vessel 18 accordingly provides a suitable environment for agitating aqueous fluid 26 in a manner that provides suitable turbulent flow characteristics, while also preventing 3D part 14 from being knocked around, which may otherwise occur in larger spaces.

Figure 4C:
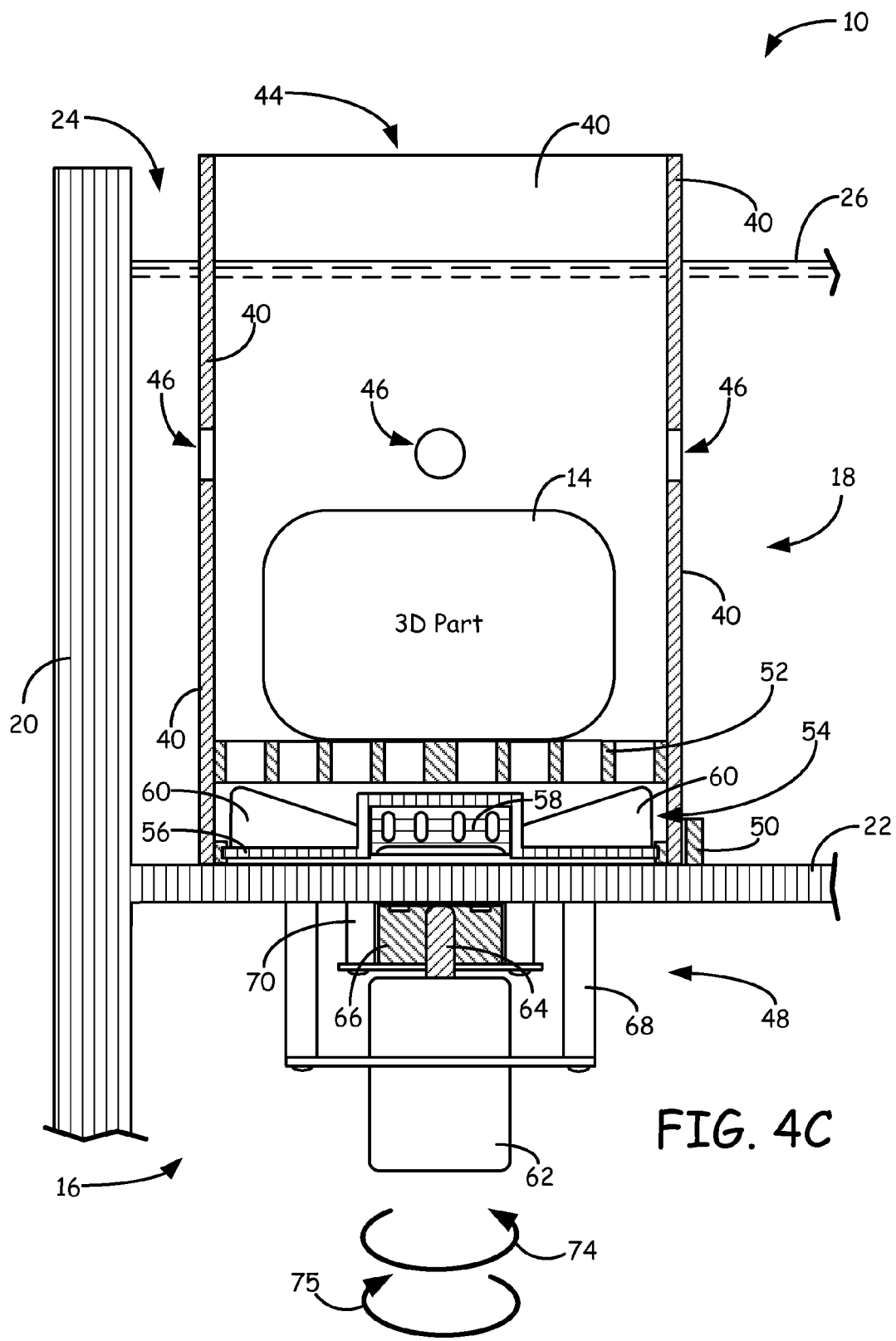

As shown in FIG. 4C, after the removal process is complete, support structure 15 is removed from 3D part 14. For example, the entire support structure 15 may be dissolved in aqueous solution 26 (as shown). Alternatively, portions of support structure 15 may be dissolved in aqueous solution 26, thereby causing chunks of support structure 15 (not shown) to separate from 3D part 14 and reside in vessel 18.

Figure 4D:
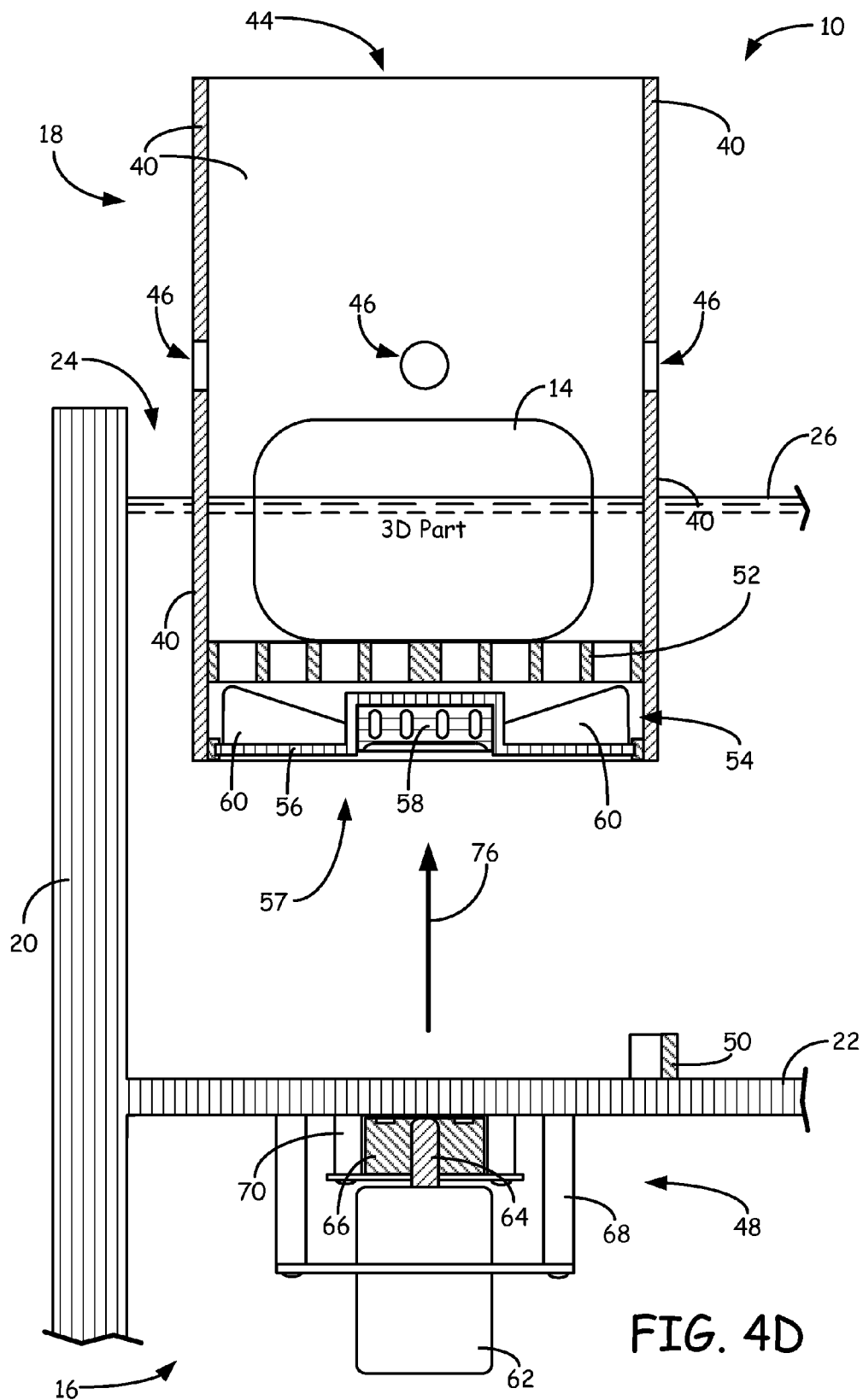

As shown in FIG. 4D, motor 62 may then be deactivated, and vessel 18 may be removed from reservoir tank 16 (depicted by arrow 76). Upon removal from interior volume 24, aqueous fluid 26 drains from lateral openings 46, floor screen 52, and bottom opening 57. The resulting 3D part 14 may then rest in vessel 18 until dried, or may be removed from vessel 18 and dried. After removing the 3D part 14, vessel 18 is then ready to receive another printed 3D part 14/support structure 15 for a subsequent removal process.

As mentioned above, removal system 10 is configured to receive multiple 3D parts 14 with corresponding soluble support structures 15, and to efficiently remove (e.g., dissolve) the soluble support structures 15 from the respective 3D parts 14 on an individual basis by agitating portions of a common aqueous fluid 26 in a localized manner. As such, removal system 10 is particularly suitable for use with 3D printing farms of additive manufacturing systems (e.g., farm 12) capable of printing 3D parts 14 in large-production volumes.

Figure 5:
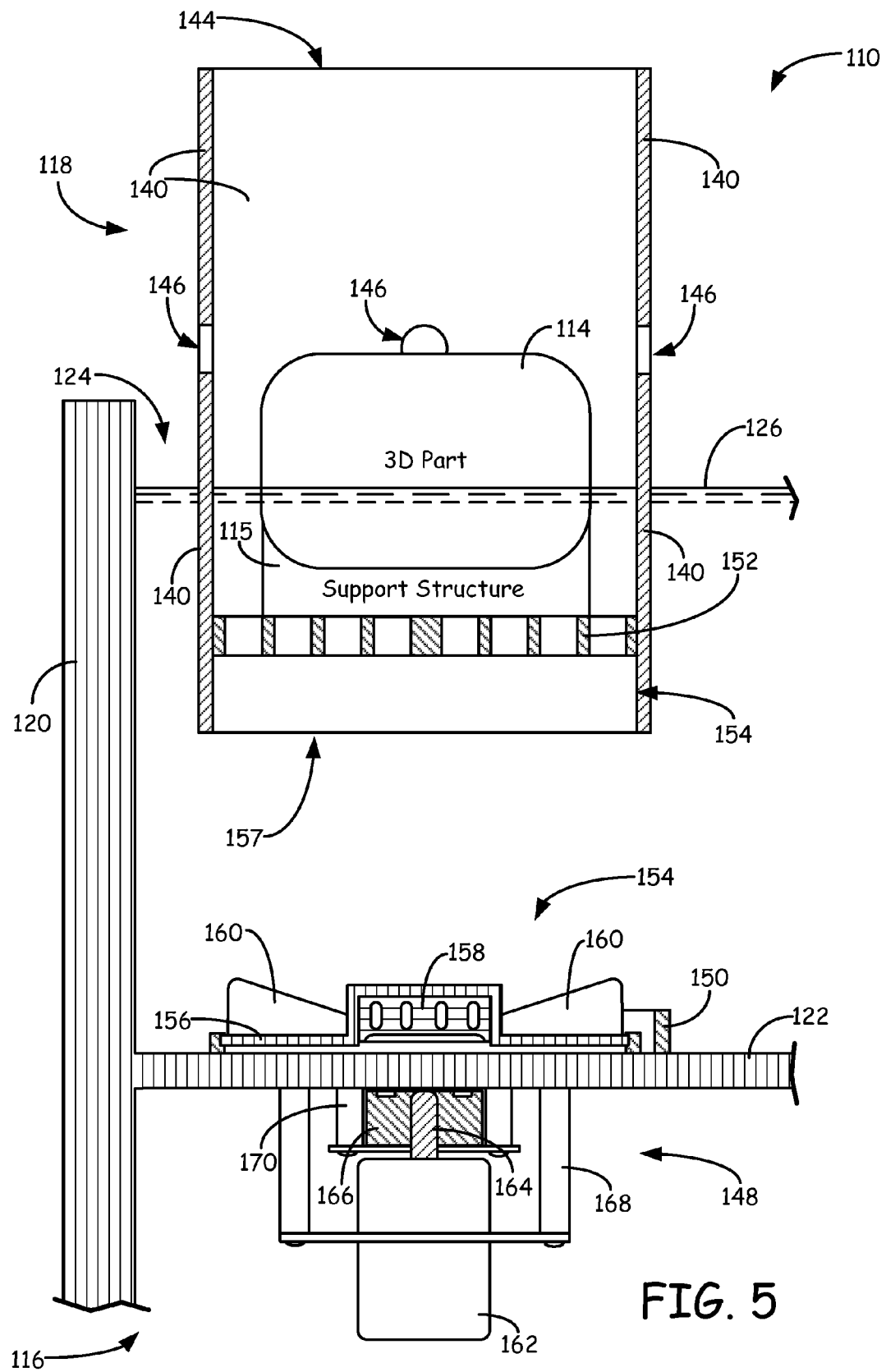
FIG. 5 is an alternative sectional view of Section 4-4 taken in FIG. 3, illustrating an alternative support structure removal system of the present disclosure.

FIG. 5 illustrates removal system 110, which is an alternative to removal system 10, where the reference numbers of corresponding components are increased by "100" from those of removal system 10. As shown in FIG. 5, in this embodiment, impeller assembly 154 is retained by reservoir tank 116, rather than being retained by vessel 118. Removal system 110 may operate in the same manner as system 10 for removing support structure 115 from 3D part 114. During use, vessel 118 may be inserted into interior volume 124 of reservoir tank 116 and aligned with impeller assembly 154. When vessel 118 is fully inserted into reservoir tank 116, magnet assembly 148 may rotate impeller 160 in the same manner as discussed above for removal system 10 to agitate aqueous fluid 126 within vessel 118.

In a further alternative embodiment, drive shaft 164 may extend through tank floor 122 and connect with impeller 160. In this embodiment, impeller 160 may be rotated directly by the activation of motor 162, rather than through the use of a generated rotating magnetic field. However, tank floor 122 requires good seals around drive shaft 164 to prevent leakage of aqueous fluid 126. These embodiments illustrate suitable rotation-inducing assemblies that may be incorporated into the removal system of the present disclosure to agitate the common aqueous fluid in a localized manner.

Figure 6:
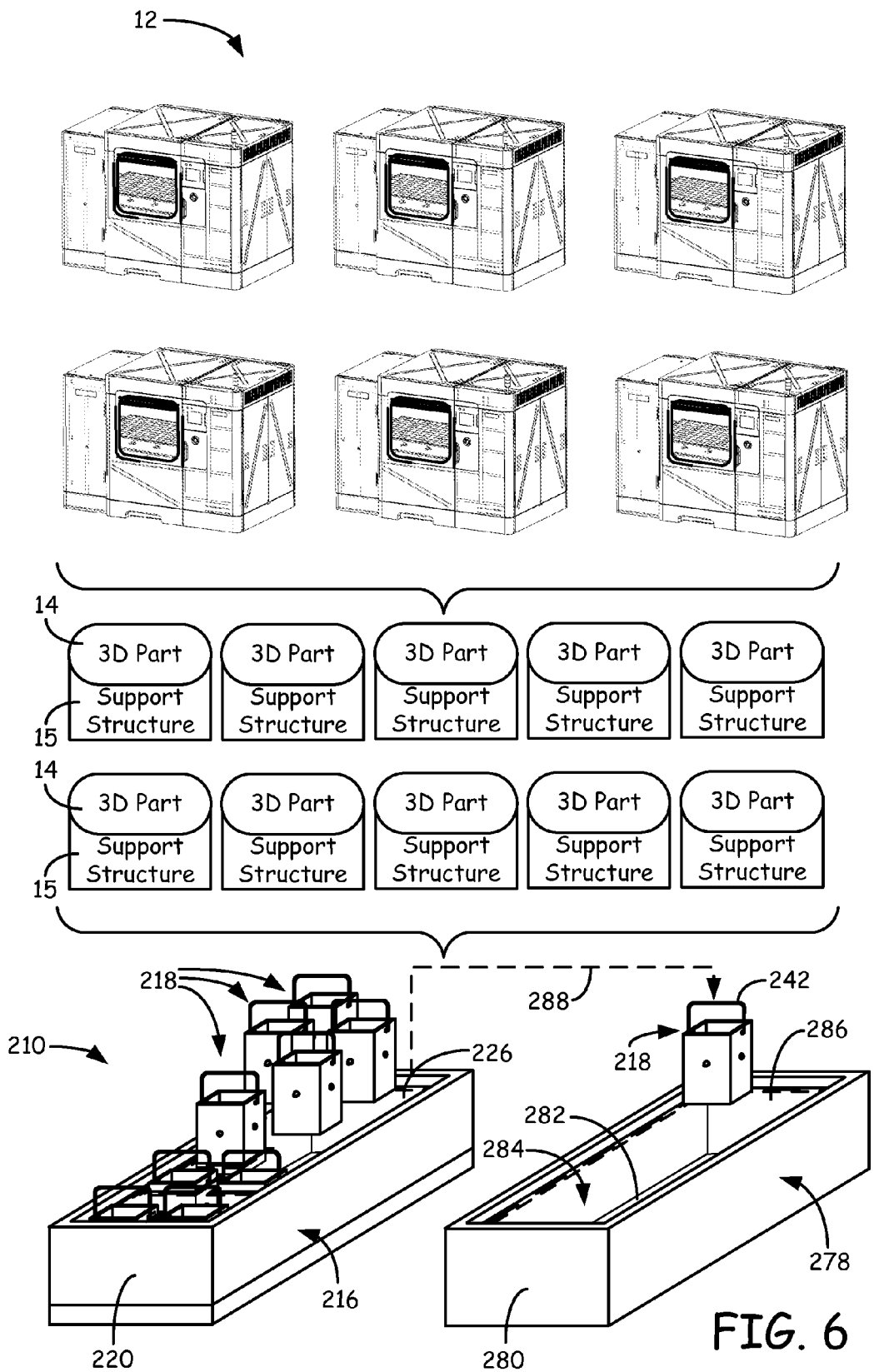
FIG. 6 is a schematic illustration of a second alternative support structure removal system of the present disclosure in use with a 3D printing farm of additive manufacturing systems.

As mentioned above, the support structure removal systems of the present disclosure may also include a separate rinsing tank to clean 3D parts 14 after the support removal process. FIG. 6 illustrates removal system 210 in use with farm 12, where removal system 210 is an additional alternative to removal system 10, where the reference numbers of corresponding components are increased by "200" from those of removal system 10. As shown, removal system 210 includes reservoir tank 216 and vessels 218, which may function in the same manner as reservoir tank 16 and vessels 18 of removal system 10.

In addition, removal system 210 also includes rinsing tank 278, which is a separate tank from reservoir tank 216 for rinsing 3D parts 14 and the support removal process in reservoir tank 216 is completed. Rinsing tank 278 includes tank walls 280 and tank floor 282, which define interior volume 284 for holding a rinsing fluid, referred to as rinsing fluid 286. Tank walls 280 and tank floor 282 are desirably fabricated in a sealed arrangement from one or more metallic and/or polymeric materials (e.g., stainless steel) to prevent rinsing fluid 286 from leaking. While illustrated with a single rinsing tank 278, removal system 210 may alternatively include two or more rinsing tanks 278 to perform multiple serial rinsing operations.

For example, tank walls 280 and tank floor 282 may also be molded or otherwise formed from a single sheet of a metallic and/or polymeric material, without any openings therethrough, except for fluid lines (not shown). While illustrated with a rectangular cross section, reservoir tank 16 may alternatively have a variety of different geometric cross sections. Suitable volumes for interior volume 24 may also vary depending on particular needs. Examples of suitable volumes for rinsing tank 278 include those discussed above for reservoir tank 10.

Rinsing fluid 286 may be one or more aqueous liquids or solutions configured to rinse 3D parts 14 after being immersed in aqueous fluid 226. This is beneficial in embodiments in which aqueous fluid 226 is less user friendly, such as having a low pH. Examples of suitable aqueous liquids or solutions for rinsing fluid 286 include water, and optionally, one or more additives to assist in the rinsing operation, such as pH modifiers, pH buffers, and the like.

After being immersed in aqueous fluid 226 within reservoir tank 216 and a vessel 218, a user may raise the given vessel 218 out from aqueous fluid 226 with handle 242, and allow aqueous fluid 226 to drain from the raised vessel 218. The user may then carry the vessel 218 retaining the 3D part 14 from reservoir tank 216 to rinsing tank 278 with handle 242, and immerse the vessel 218 (and the retained 3D part 14) in rinsing fluid 286 (as illustrated by arrow 288). The retained 3D part 14 may then undergo one or more rinsing operations in rinsing tank 278. Vessels 218 are particularly suitable for carrying 3D parts 14 from reservoir tank 216 to rinsing tank 278 without having to directly handle the 3D parts 14 or any other component that has been in direct contact with aqueous fluid 226. This increases user safety when using aqueous fluids 226 that are less use friendly.

In one embodiment, rinsing tank 278 may also include multiple magnet assemblies (not shown), which may function in the same manner as magnet assemblies 248 for agitating rinsing fluid 286 within each vessel 218. This may increase the rates at which 3D parts 14 are rinsed in rinsing tank 278.

Figure 7:
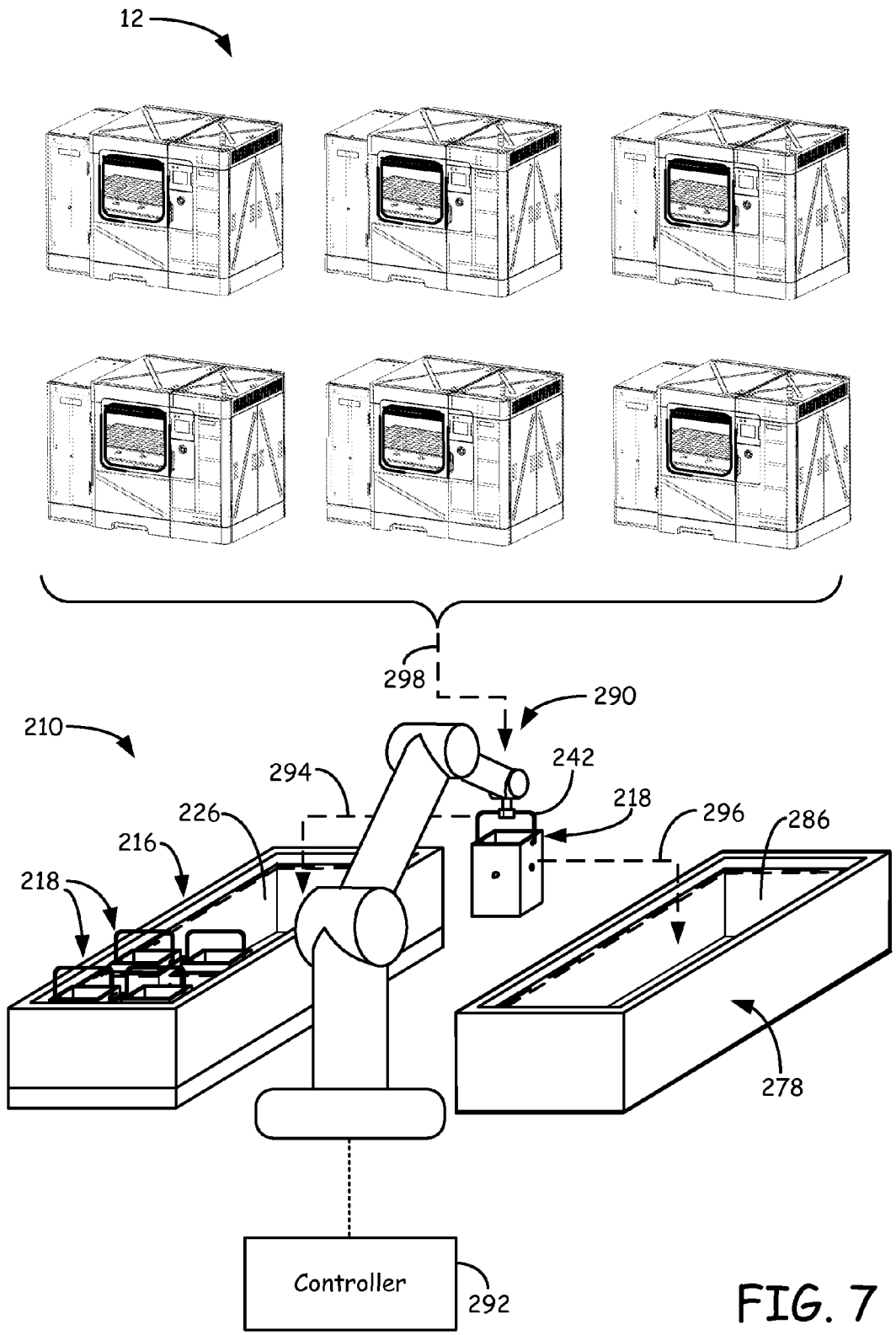
FIG. 7 is a schematic illustration of the second alternative support structure removal system in use with a 3D printing farm of additive manufacturing systems and a first robotic mechanism including a robotic arm.

The support structure removal systems of the present disclosure (e.g., removal systems 10 and 210) may also be incorporated into automated processes. For example, as shown in FIG. 7, system 210 and farm 12 may be operated in an automated manner, such as with one or more robotic mechanisms (e.g., robotic arm 290, which is operated with controller 292). For example, controller 292 (i.e., one or more computer-based controllers) may operate robotic arm 280 to individually insert vessels 218 (containing 3D parts and support structures from farm 12) into reservoir tank 216 in an automated manner, as illustrated by arrow 294. In this embodiment, robotic arm 292 may be calibrated to position each vessel 218 at a preset location within reservoir tank 216 with proper registration. This ensures vessels 218 are properly aligned with their respective magnet assemblies 248 when inserted. Controller 292 also desirably records the locations within reservoir tank 216 that currently retain vessels 218 and the locations that are currently available, and directs robotic arm 290 to insert and remove vessels 218 based on the recorded locations.

Controller 292 also desirably retains information on how long each vessel 218 resides in reservoir tank 216, allowing controller 292 to direct robotic arm 290 to move vessels 218 from reservoir tank 216 to rinsing tank 278 on an individual basis (as illustrated by arrow 296) after residing in aqueous fluid 226 for a suitable period of time. During the operation to move a given vessel 218 from reservoir tank 216 to rinsing tank 278, controller 292 directs robotic arm 290 to lift the vessel 218 from aqueous fluid 226 in reservoir tank 216, and desirably directs robotic arm 290 to hold the vessel 218 over reservoir tank 216 for a suitable duration to allow aqueous fluid 226 to drain from the vessel 218 down into reservoir tank 216.

Robotic arm 290 may then be directed to move the vessel 218 to rinsing tank 278 to undergo one or more rinsing operations in rinsing fluid 286. Robotic arm 290 may then be directed to move the vessel 218 to another location to allow the retained 3D part to dry. During this operation, controller 292 directs robotic arm 290 to lift the vessel 218 from rinsing fluid 286 in rinsing tank 278, and desirably directs robotic arm 290 to hold the vessel 218 over rinsing tank 278 for a suitable duration to allow rinsing fluid 286 to drain from the vessel 218 down into rinsing tank 278. Alternatively, rinsing tank 278 may be drained while the vessel 218 resides in rinsing tank 278, allowing rinsing fluid 286 to drain from the vessel 218 during this draining process.

In one embodiment, the one or more robotic mechanisms (e.g., robotic arm 290) may also be configured to remove the 3D parts and support structures from the additive manufacturing systems of farm 12 on an individual basis, and to place the 3D parts and support structures in vessels 218, in an automated manner, as illustrated by arrow 298. Thus, the entire support removal operation may be performed in an automated manner to further accommodate the run-time variations and dissolution-time variations for the 3D parts and support structures printed with the additive manufacturing systems of farm 12.

Figure 8:
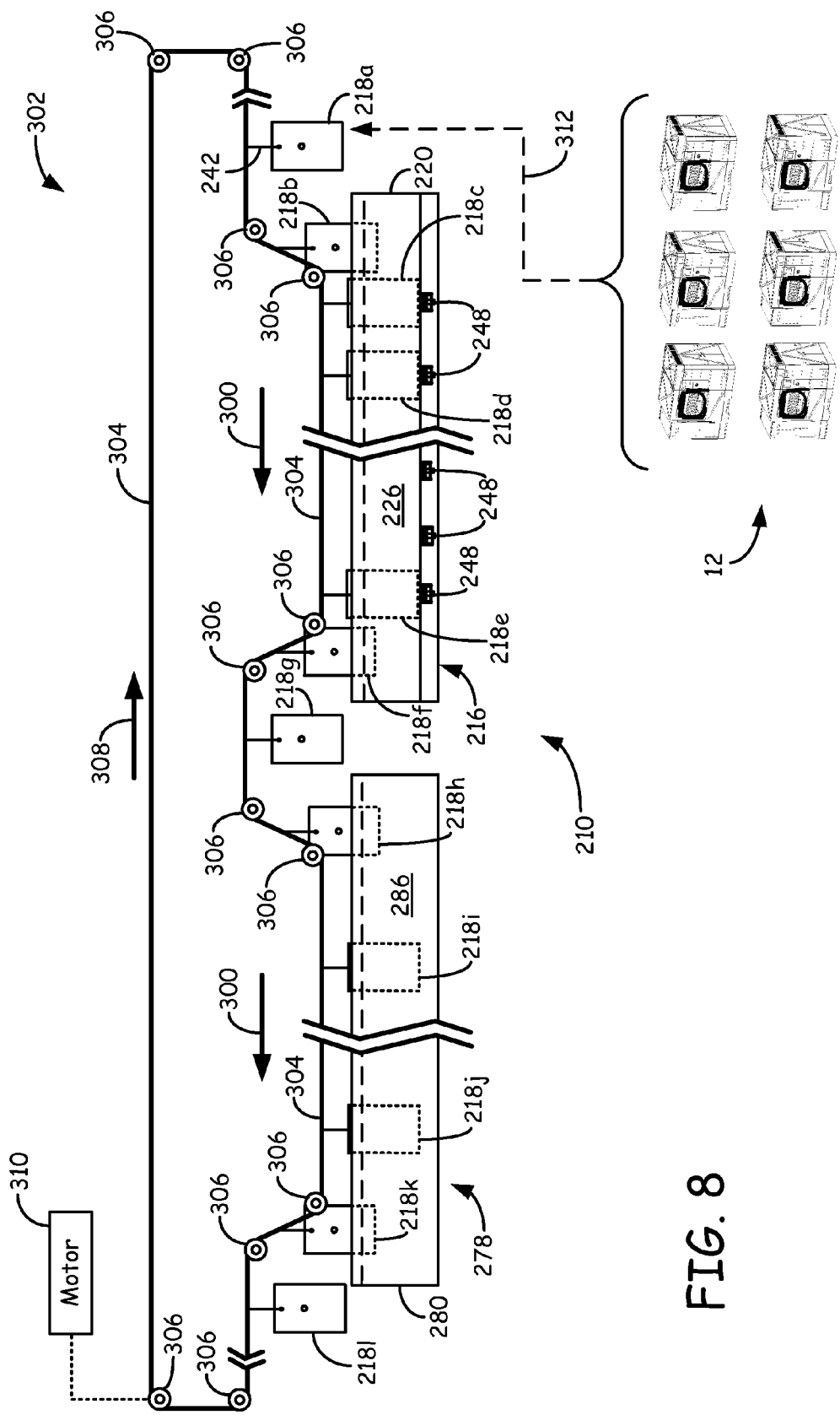
FIG. 8 is a schematic illustration of the second alternative support structure removal system in use with a 3D printing farm of additive manufacturing systems and a second robotic mechanism that includes a line assembly.

FIG. 8 illustrates an alternative arrangement for operating system 210 and farm 12 in an automated manner. In this embodiment, reservoir tank 216 and rinsing tank 278 may be aligned lengthwise in a serial manner, allowing multiple vessels 218 to be carried in the directions of arrows 300 with line assembly 302. Line assembly 302 is a robotic mechanism that includes carry line 304 and pulleys 306, where carry line 304 is a belt, chain, or similar component that is engaged with pulleys 306. Pulleys 306 are rotatable pulleys, gears, or similar components configured to maintain tension on carry line 304 and to pull and rotate carry line 304 in the direction of arrows 300 and 308 in an incremental manner with one or more drive motors (e.g., drive motor 310).

During operation, vessels 218 (retaining 3D parts and soluble support structures) may be individually suspended from carry line 304 (e.g., via handles 242), upstream from reservoir tank 216 as illustrated by vessel 218a. Upon reaching the upstream end of reservoir tank 216, carry line 304 lowers the suspended vessels 218 into reservoir tank 216, as illustrated by vessels 218b. As vessels 218 lower into reservoir tank 216, aqueous fluid 226 fills vessels 218, as discussed above.

When fully inserted into reservoir tank 216, as illustrated by vessel 218c, each vessel 218 is desirably aligned and coupled with a magnet assembly 248 to agitate the aqueous fluid 226 within each vessel 218, as discussed above, for a suitable pause period. During each pause period, line assembly 302 does not move carry line 304 or the suspended vessels 218. This allows each vessel 218 to remain coupled with a respective magnet assembly 248 in reservoir tank 216. The durations of the pause periods may vary depending on the required amounts of time to dissolve the soluble support structures, and the length of reservoir tank 216. Examples of suitable times for each pause period range from about one minute to about ten minutes.

After a pause period expires, carry line 304 is moved a single increment in the direction of arrows 300 to move each suspended vessel 218 to the next adjacent magnet assembly 248, as illustrated by vessel 218d. Carry line 304 may then continue to move vessels 218 in the direction of arrows 300 in an incremental manner to each adjacent magnet assembly 248 until the last magnet assembly 248 is reached, as illustrated by vessel 218e. During each pause period, magnet assemblies 248 may agitate the aqueous fluid 226 within each aligned and coupled vessel 218, as discussed above.

At the downstream end of reservoir tank 216, carry line 304 then raises vessels 218 out of aqueous fluid 226, as illustrated by vessel 218f. Aqueous fluid 226 desirably drains out of vessels 218 back into reservoir tank 216 as vessels 218 are raised. Carry line 304 continues to raise vessels 218 upward in the incremental manner until the given vessel 218 clears tank walls 220. Carry line 304 may then move the raised vessels 218 toward rinsing tank 278, as illustrated by vessel 218g.

At the upstream end of rinsing tank 278, carry line 304 then lowers the suspended vessels 218 into rinsing tank 216 in the incremental manner, as illustrated by vessels 218h. As vessels 218 lower into rinsing tank 278, rinsing fluid 286 fills vessels 218, as discussed above. When fully inserted into rinsing tank 278 (as illustrated by vessel 218i), carry line 304 may continue to move vessels 218 in the direction of arrows 300 in the incremental manner, as illustrated by vessel 218j.

At the downstream end of rinsing tank 278, carry line 304 then raises vessels 218 out of rinsing fluid 286, as illustrated by vessel 218k. Rinsing fluid 286 desirably drains out of vessels 218 back into rinsing tank 278 as vessels 218 are raised. Carry line 304 continues to raise vessels 218 upward until the given vessel 218 clears tank walls 280. Carry line 304 may then move the raised vessels 218 away from rinsing tank 278, as illustrated by vessel 218l. Vessels 218 may then be individually detached from carry line 304 for drying the resulting 3D parts. Alternatively, vessels 218 may continue to be carried to a separate drying station (not shown) to dry the resulting 3D parts.

The continuous process attainable with line assembly 302 is also beneficial for removing soluble support structures from 3D parts in an automated manner. In comparison to the arrangement with robotic arms (e.g., robotic arm 290, shown in FIG. 7), line assembly 302 does not need to record the locations within reservoir tank 216 or rinsing tank 278 that currently retain vessels 218 or the locations that are currently available. Rather, vessels 218 may be attached to carry line 304 at one or more locations upstream from reservoir tank 216, and the movement of carry line 304 in the direction of arrows 300 moves vessels 218 through reservoir tank 216 and rinsing tank 278, as discussed above.

While illustrated in use with a single line assembly 302, in alternative embodiments, removal system 210 may be used with multiple, parallel line assemblies 302. For example, a pair of parallel line assemblies 302 may move vessels 218 between reservoir tank 216 and rinsing tank 278, with coordinated or independent movements. In embodiments in which the parallel line assemblies 302 operate with coordinate movements in the directions of arrows 300 and 308, common pulleys 306 may be used with the separate parallel carry lines 304 to move the separate carry lines 304 together through reservoir tank 216 and rinsing tank 278 in the incremental manner.

In one embodiment, one or more robotic mechanisms (e.g., robotic arm 290, shown in FIG. 7) may also be used to remove the 3D parts and support structures from the additive manufacturing systems of farm 12 on an individual basis, to place the 3D parts and support structures in vessels 218, and/or to suspend vessels 218 from carry line 304 at an upstream location relative to reservoir tank 216, as illustrated by arrow 312. Thus, this support removal operation may also be performed in an automated manner to further accommodate the run-time variations and dissolution-time variations for the 3D parts and support structures printed with the additive manufacturing systems of farm 12.

The support structure removal systems of the present disclosure (e.g., removal systems 10 and 210) are also suitable for use in combination with 3D parts that incorporate identification-tag inserts (e.g., radio-frequency identification (RFID) tags), as disclosed in Kozlak et al., U.S. Patent Application Publication No. 2009/0173443. For example, the automated systems shown in FIGS. 7 and 8 may use information from an RFID tag embedded within a 3D part to adjust the operating parameters, such as setting the temperature within reservoir tank 216, setting the time in which vessels 218 reside in reservoir tank 216, and the like. This further improves the efficiencies in removing the soluble support structures from the 3D parts with the support structure removal systems of the present disclosure.

Figure 9A:
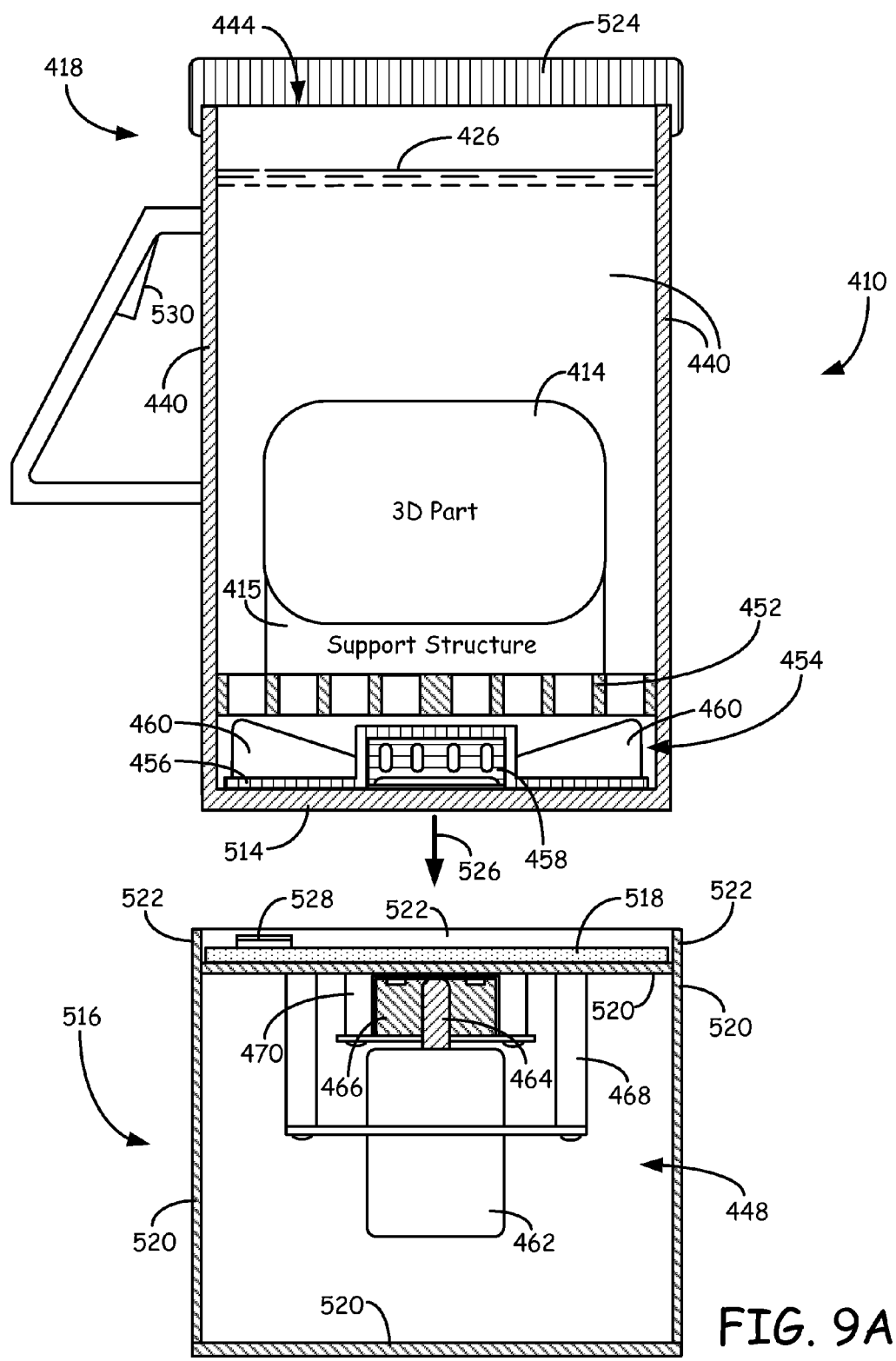
FIGS. 9A and 9B are sectional views illustrating a third alternative support structure removal system, which includes a removable vessel in use with a base unit having a magnet assembly.
Figure 9B:
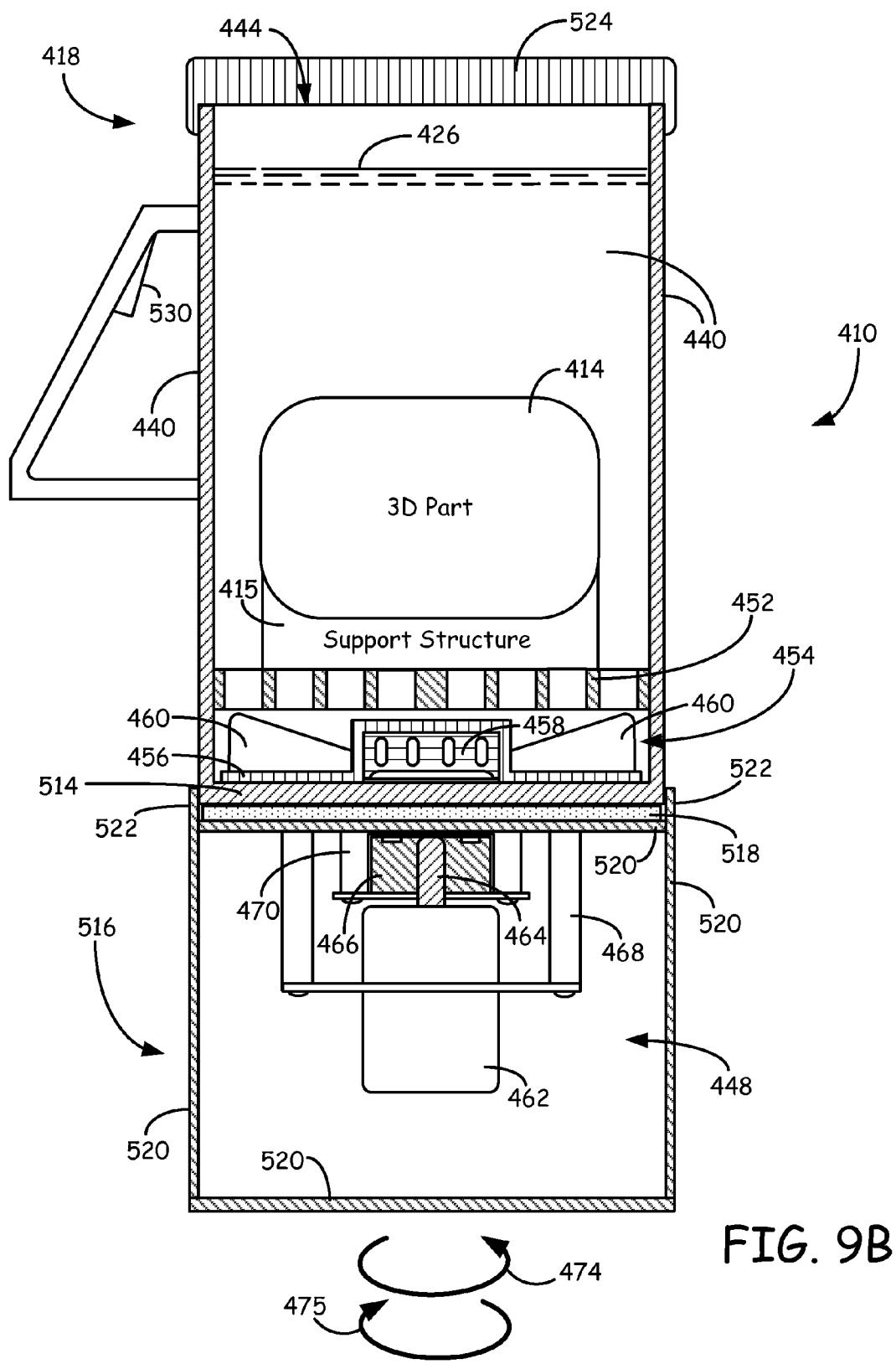

FIGS. 9A and 9B illustrate removal system 410, which is another alternative to removal system 10, where the reference numbers of corresponding components are increased by "400" from those of removal system 10. As shown in FIG. 9A, in this embodiment, vessel 418 also functions as a reservoir tank for retaining aqueous fluid 426. As such, vessel 418 also includes floor 514, which is desirably integrally formed with vessel body 440 to define a sealed interior volume below top opening 444. In other words, vessel body 440 and floor 514 are desirably free of lateral and bottom openings.

Removal system 410 also includes base unit 516, which includes a single motor assembly 448, heating element 518, and frame body 520. Frame body 520 provides structural support for base unit 516, and includes alignment members 522, which extend upward to align and retain vessel 418, as discussed below. Motor assembly 448 functions in the same manner as motor assembly 40, and is secured to frame body 520 with retention bracket 468. Heating element 518 is a heat exchanger (e.g., a temperature-controlled silicone pad heater) retained by frame body 520, and is configured to generate heat for heat aqueous fluid 426, as discussed below.

Removal system 410 may operate in a similar manner as system 10 for removing support structure 415 from 3D part 414. During use, aqueous fluid 426 may be introduced into vessel 418 through top opening 444, and 3D part 414/support structure 415 may be inserted as shown. In this embodiment, vessel 418 may also include lid 524 that may be secured to the top of vessel body 440 to prevent aqueous fluid 426 from splashing out of vessel 418.

Vessel 418 may then be mounted on base unit 516, as illustrated by arrow 526. Base unit 516 also includes locking latch 528, which is configured to engage a reciprocating element of vessel body 440 (not shown) to lock vessel 418 to base unit 516. As discussed below, handle 442 of vessel 418 includes release trigger 530, which is configured to disengage the reciprocating element of vessel body 440 from locking latch 528 when removing vessel 418 from base unit 516.

As shown in FIG. 9B, when vessel 418 is locked to base unit 516, vessel body 440 is aligned within alignment members 522, and floor 514 of vessel body 440 rest flush on heating element 518. Heating element 518 may then be operated to conductively heat aqueous fluid 426 through floor 514.

Magnet assembly 148 may then be activated to rotate impeller 460 in the same manner as discussed above for removal system 10 to agitate aqueous fluid 426 within vessel 418. In this embodiment, however, the entirety of aqueous fluid 426 remains within vessel 418 during agitation, where the agitated portion of aqueous fluid 426 is drawn and jetted through floor screen 452, and flows throughout the interior region of vessel body 440. As discussed above, motor assembly 448 desirably reverses the rotational direction of impeller 460 periodically, as discussed above, and as illustrated by arrows 474 and 475.

When support structure 415 is removed from 3D part 414, magnet assembly 148 may be halted and heating element 518 may be turned off. A user may then actuate release trigger 530 to unlock vessel 418 from base unit 516, and lift vessel 418 with handle 442. The user may then remove lid 524, and pour aqueous fluid 526 (containing the dissolved support material) out of vessel 418 via top opening 444 in an environmentally-friendly manner. The user may also remove 3D part 414 through top opening 444.

Removal system 410 is suitable for use with individual additive manufacturing systems, and provides a convenient and effective manner for removing soluble support structures from 3D parts. Furthermore, a single base unit 516 may be used with multiple, interchangeable vessels 418. In another embodiment, base unit 516 may include multiple magnet assemblies 448 for coupling with multiple, adjacent vessels 418. As such, removal system 410 may also be used with multiple additive manufacturing systems, such as farm 12.

Although the present disclosure has been described with reference to preferred embodiments, workers skilled in the art will recognize that changes may be made in form and detail without departing from the spirit and scope of the disclosure.

The invention claimed is:

1. A support structure removal system comprising:
   a vessel comprising:
      a vessel body having a top opening, the vessel body being configured to retain an aqueous fluid;
      a porous floor supported by the vessel body, wherein the porous floor is configured to retain a three-dimensional part inserted through the top opening; and
      an impeller rotatably mounted below the porous floor; and
   a second component comprising:
      a surface configured to operably receive the vessel; and
      a rotation-inducing assembly located below the surface, the rotation-inducing assembly being configured to rotate the impeller with magnetic fields when the vessel is received on the surface of the second component to agitate and direct flows of the aqueous fluid through the porous floor.

2. The support structure removal system of claim 1, and further comprising at least one heating element configured to heat the aqueous fluid.

3. The support structure removal system of claim 1, wherein the rotation-inducing assembly is configured to rotate the impeller with the magnetic fields in a first rotation direction and a second rotational direction that is counter to the first rotational direction.

4. The support structure removal system of claim 1, wherein the rotation-inducing assembly comprises a magnet assembly, and wherein the support structure removal system further comprises a magnetic hub secured to the impeller.

5. The support structure removal system of claim 1, wherein the second component comprises a base unit configured to receive the vessel, and wherein the vessel body further comprises a floor that is integrally formed with the vessel body to define a sealed interior volume below the top opening.

6. The support structure removal system of claim 1, wherein the second component comprises a reservoir tank having tank walls integrally formed with the surface, which define an interior volume configured to retain a supply of the aqueous fluid.

7. The support structure removal system of claim 6, wherein the vessel body comprises at least one lateral opening for filling the vessel with the aqueous solution when the vessel is inserted in the reservoir tank.

8. The support structure removal system of claim 7, wherein the vessel body defines a bottom opening of the vessel located below the impeller.

* * * * *